INVENTORS
ERNEST S. ULM
BENJAMIN STOYANOV

Oberlin, Maky, Donnelly & Renner
ATTORNEYS

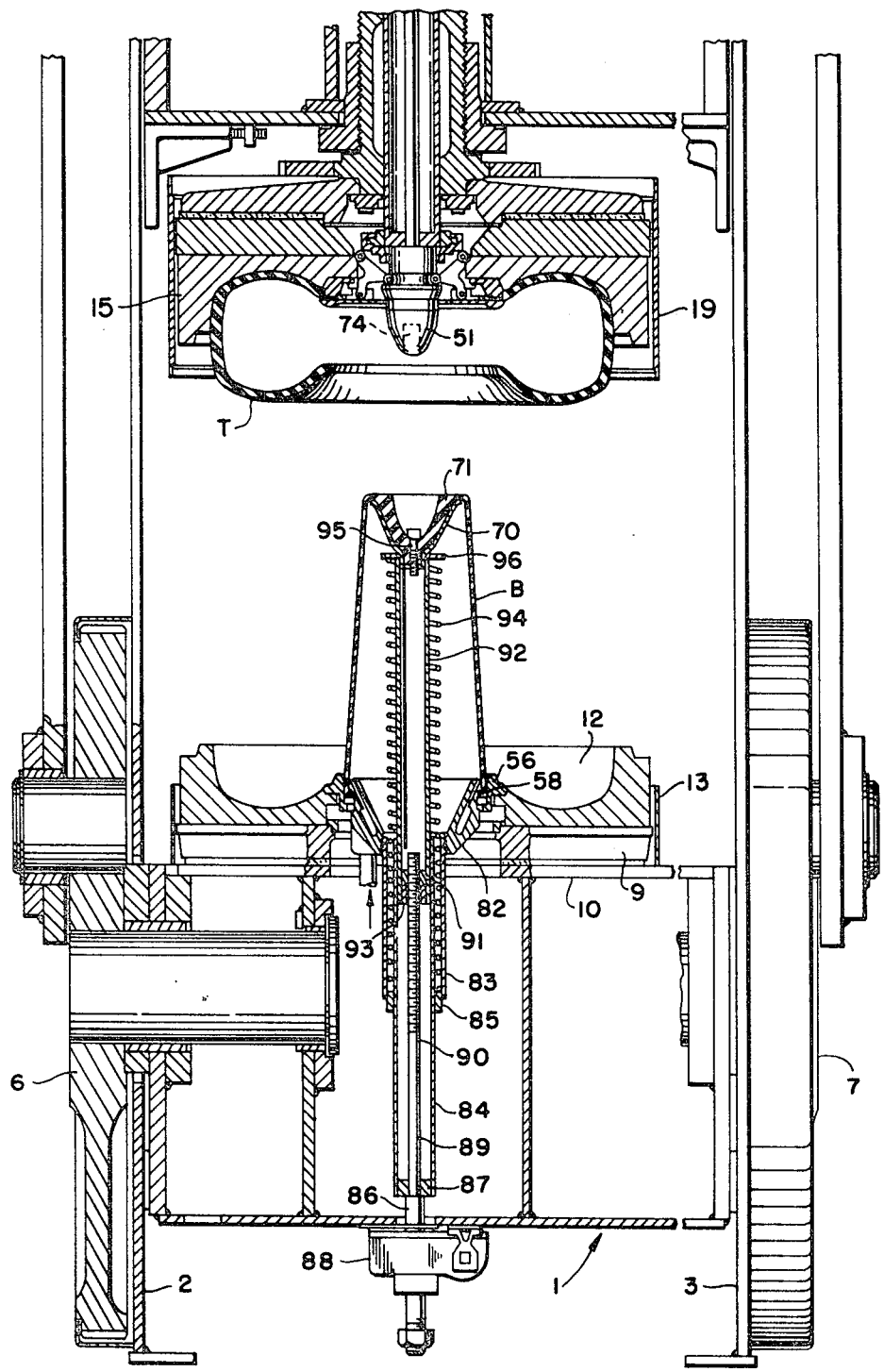

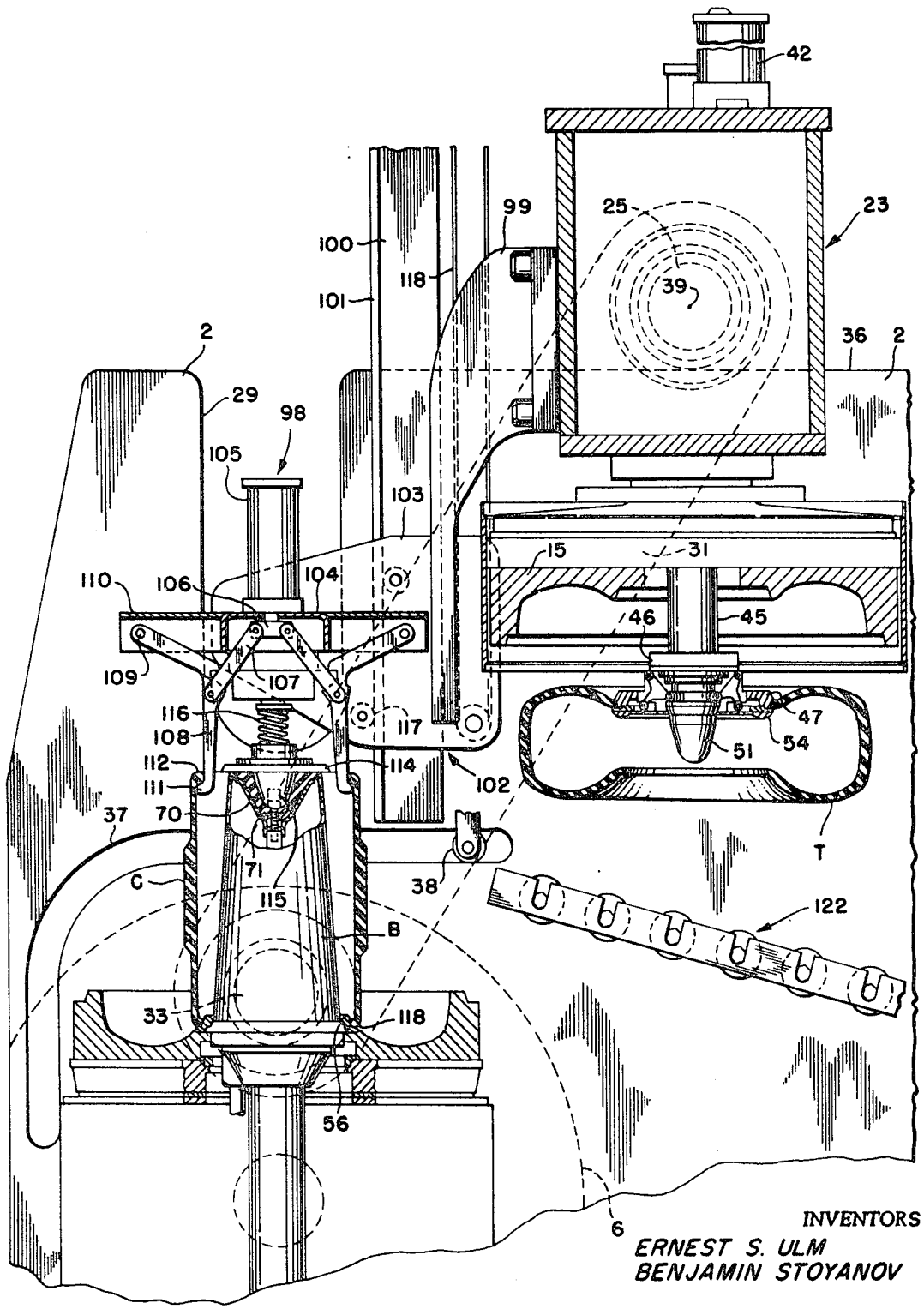

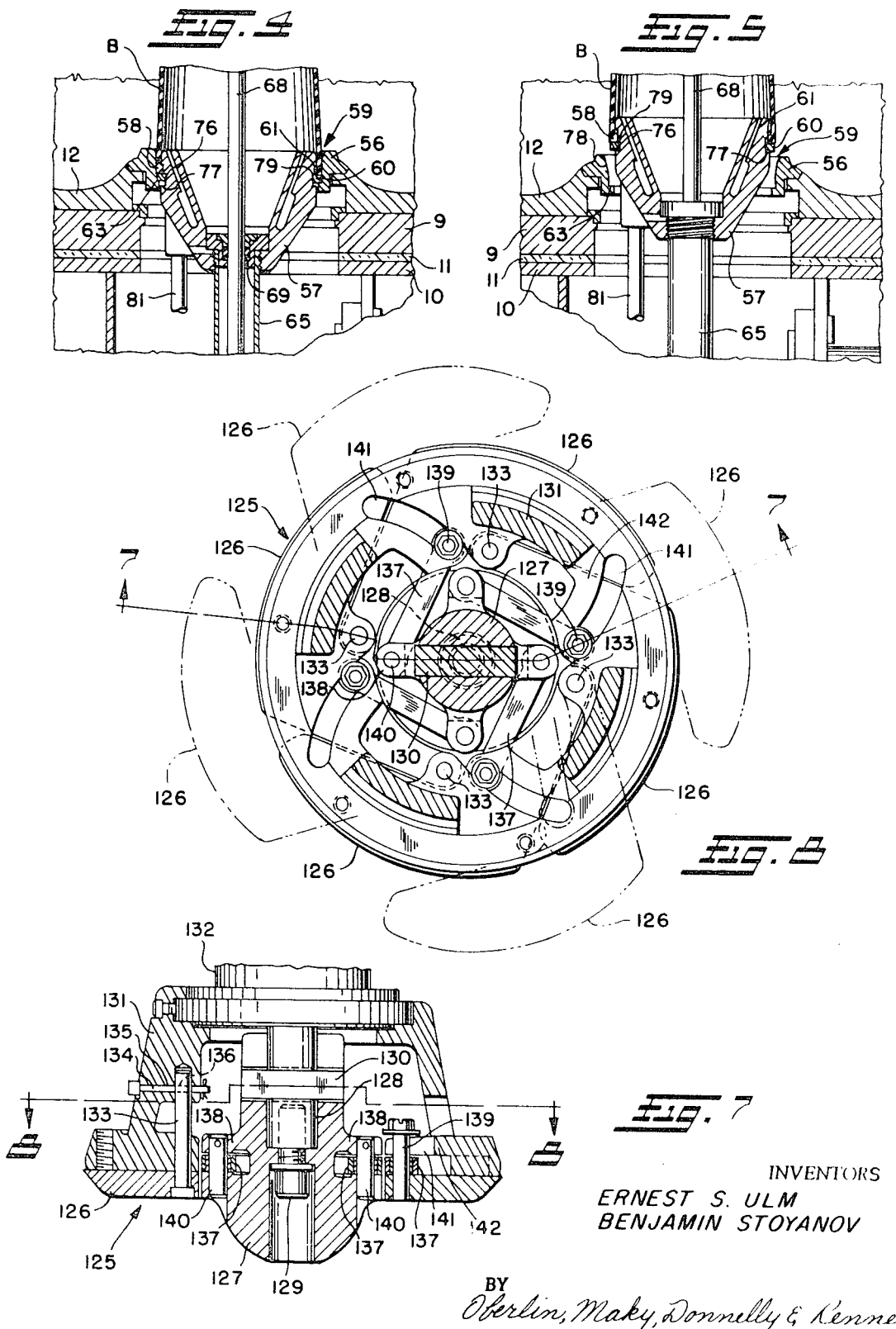

INVENTORS
ERNEST S. ULM
BENJAMIN STOYANOV

INVENTORS
ERNEST S. ULM
BENJAMIN STOYANOV

BY Oberlin, Maky, Donnelly & Renner
ATTORNEYS

United States Patent Office 3,584,335
Patented June 15, 1971

3,584,335
TIRE CURING PRESS WITH LOADER AND REMOVAL DEVICES
Ernest S. Ulm, Stow, and Benjamin Stoyanov, Akron, Ohio, assignors to NRM Corporation, Akron, Ohio
Original application Jan. 19, 1967, Ser. No. 610,419, now Patent No. 3,471,895, dated Oct. 14, 1969. Divided and this application Oct. 7, 1969, Ser. No. 864,416
Int. Cl. B29h 5/02; B29c 3/00
U.S. Cl. 18—2        9 Claims

ABSTRACT OF THE DISCLOSURE

A tire curing press having upper and lower complementary mold sections and a readily replaceable bladder shaping assembly urged by a post assembly to its axially extended position. A pilot on the loader and movable mold section is received in a socket on bladder and post assembly during loading and shaping operations of press cycle. A chuck underlies a bead of cured tire as press is opened to strip same from stationary mold section for movement with movable mold section.

---

This application is a division of U.S. application Ser. No. 610,419, filed Jan. 19, 1967, now Patent No. 3,471,-895, and relates generally as indicated to a tire curing press and more particularly to a fully automatic yet highly simplified press for the vulcanizing of tires.

Tire curing presses which have an upstanding bladder shaping assembly mounted in the lower mold section are generally inherently complex in nature because of the problems of loading a green tire carcass thereover and stripping the cured tire therefrom. A cured tire must not only be stripped axially of the upstanding bladder assembly, but must also be moved laterally clear of the upstanding bladder assembly and the bottom mold section before the loading operation for the next cycle can commence. Moreover, upstanding bladder assemblies normally require to be positively connected to center post structures at their upper ends to provide proper centering of the bladder with respect to the tire carcass and the mold sections. Proper centering of the bladder assembly is, of course, highly desirable during both the loading and shaping portions of the press cycle. Moreover, long bladder life and the ability quickly to replace bladders when require are important factors in the economic operation of a tire press.

It is therefore a principal object of the present invention to provide an automatic tire curing press of the upstanding bladder type having faster cycle time than heretofore available.

A further principal object is the provision of an upstanding bladder tire curing press of more simplified and economical design.

Yet another object is the provision of a tire curing press of the upstanding bladder type having a shorter loading and unloading cycle with the press open thus providing a more efficient press.

These and other objects are achieved by a tire curing press having upper and lower complementary mold sections in which the upper mold section is vertically movable away from and laterally of the lower mold section, and the lower mold section has an axially extending bladder assembly which is resiliently urged to its axially extended position by a post assembly. The bladder assembly desirably has a molded socket which fits in a socket on the upper end of the post assembly, and there are pilots on both the loader and upper mold section of the press which are adapted to be received in the mold socket of the bladder assembly for proper centering of the bladder assembly during the loading and shaping operations of the press cycle.

A novel unloading chuck may be provided for underlying the upper bead of a variety of different tire sizes to insure that the tires will be carried by the upper mold section during opening of the press. Moreover, the open end of the bladder assembly is clamped in a unique manner between the spray ring and lower toe ring of the press to provide a tight fluid seal, and the spray ring is supported by the outer cylinder or sleeve of the post assembly for vertical movement therewith to permit ready replacement of the bladder assembly when required.

Yet another object is the provision of a simplified bladder assembly for tire curing presses having positive centering during loading and shaping.

A yet further object is the provision of such bladder assembly having improved bladder life with quicker and easier bladder changes when required.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings:

FIG. 2 is a fragmentary vertical section similar to FIG. 1 illustrating the press during its opening movement and showing a slightly modified center post assembly;

FIG. 3 is a fragmentary vertical section taken through the mold sections normal to the plane of FIGS. 1 and 2 illustrating the press in its fully open position;

FIG. 4 is an enlarged fragmentary vertical section of the bladder and lower mold section of FIG. 1 illustrating the manner of clamping the open end of the bladder between the bottom toe ring and spray ring;

FIG. 5 is an enlarged fragmentary vertical section similar to FIG. 4, but with the spray ring elevated from the bottom toe ring to permit replacement of the bladder;

FIG. 7 is an enlarged partial vertical section through the unloading chuck of FIG. 6, taken on the plane of the line 7—7, FIG. 8;

FIG. 8 is a horizontal section through the unloading chuck taken on the plane of the line 8—8 of FIG. 7;

Figure 1:
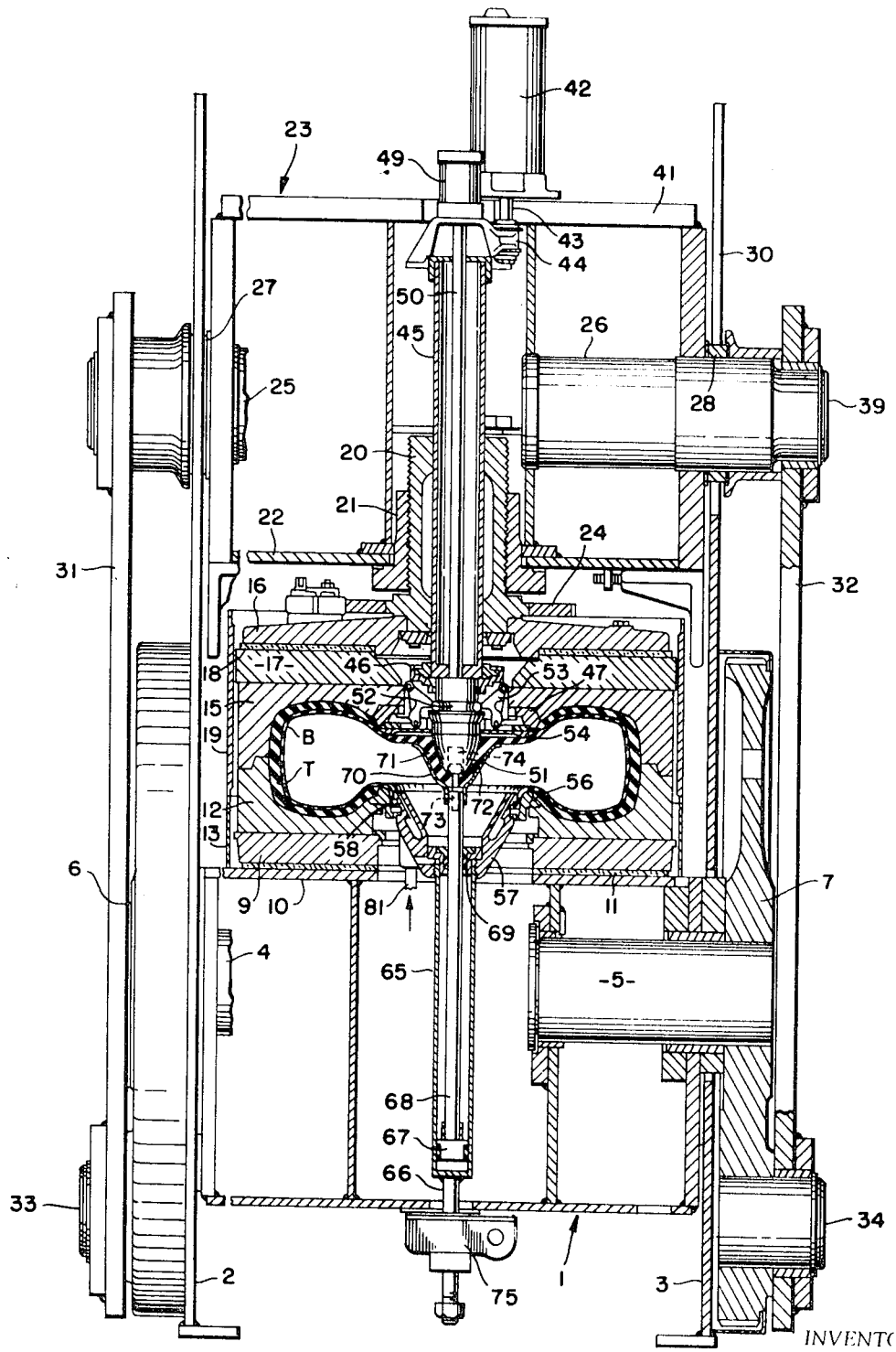
FIG. 1 is a fragmentary vertical section illustrating a press in accordance with the present invention in its closed or curing position taken through the mold sections.

Referring now in greater detail to the drawing and first especially to FIG. 1, it will be seen that the press comprises a fabricated base 1 supported between upstanding side plates 2 and 3. Stub shafts 4 and 5 project from opposite ends of the base 1 through the side plates and support bull gears 6 and 7, respectively, keyed to the projecting ends thereof. The bull gears are driven for oscillation by a motor drive unit, not shown, to open and close the press.

Annular platen 9 is supported on the top plate 10 of the press base with a layer of insulation 11 interposed therebetween. Bottom mold section 12 is then supported on the heating platen 9 and a projecting heat shield 13 surrounds the bottom mold section and platen.

The annular top mold section 15 is supported by suitable fasteners from bolster 16. A heating platen 17 and a layer of insulation 18 are interposed between the bolster and the top mold section. A heat shield 19 extends about the upper mold section. The bolster 16 is secured to the lower end of screw 20 threaded in nut 21 which is in turn secured to the bottom plate 22 of the fabricated beam or head 23 of the press. Rotation of the screw 20 and thus vertical adjustment of the top mold section 15 with respect to the press head 23 is obtained by gear 24.

The press head 23 has projecting from opposite ends thereof pins 25 and 26 on which are mounted rollers 27 and 28, respectively, riding in slots 29 and 30 in the side plates 2 and 3. The outer ends of the pins 25 and 26 are secured to links 31 and 32, respectively, which at their lower ends are similarly secured to pins 33 and 34 projecting from the respective bull gears 6 and 7.

It can now be seen that rotation of the bull gears in unison in a clockwise direction as viewed in FIG. 3 will cause the rollers 27 and 28 to move vertically up the slots 29 and 30 to move the upper and lower mold sections 15 and 12 vertically apart. Continued rotation of the bull gears in such clockwise direction will then cause the press head 23 and, of course, the top mold section 15 mounted thereon to move backwardly along the top edge 36 of the plates 2 and 3 as seen in FIG. 3. When the press has obtained its fully opened position in FIG. 3, counter-clockwise rotation of the bull gears will then move the press head horizontally along the top plates and then downwardly along the slots 29 and 30 to close the press. The side plates 2 and 3 are provided with cam slots as indicated at 37 in FIG. 3 in which ride followers 38 mounted on brackets secured to the press head 23. Although the center of gravity of the press head and the top mold section is vertically beneath the center 39 of the pins 25 and 26, the follower 38 will keep the press head from oscillating about such pivot and maintain the axis of the upper mold section parallel with the axis of the lower mold section in all positions of the press head. It will normally be understood that in presses of the general type illustrated, there will be two mold cavities per press, side-by-side so that two tires can be cured simultaneously.

Mounted on the top plate 41 of the press head 23 is an ejector cylinder 42, which in the illustrated embodiment may have approximately a 6" bore and a 13" stroke. The rod 43 of the cylinder projects through the plate 41 and is connected laterally to a spider 44 to which is secured the upper end of cylinder 45. The cylinder 45 extends downwardly through the screw 20 and the lower end has secured thereto a spider 46 supporting the top toe ring 47. The toe ring 47 is, of course, that portion of the tire mold which surrounds the upper bead of the tire T. Mounted on top of the upper spider 44 is a chuck actuating piston cylinder assembly 49, which in the illustrated embodiment may have a 3½" bore and a 2" stroke. The rod 50 of the assembly 49 projects axially downwardly through the cylinder 45. The rod 50 beneath the cylinder 45 is connected to pilot nose 51 which may be thus moved two inches toward and away from the bottom of the cylinder 45. An annular bell crank actuating grove 52 is provided in the pilot nose to oscillate bell cranks 53 on vertical movement of the nose. The bell cranks are pivoted at their upper ends to the spider 46 and at their lower ends to radially movable chuck plate sectors 54. Retraction of the piston cylinder assembly 49 will thus bottom the nose 51 against the bottom of the cylinder 45 retracting the chuck plate segments 54. Extension through the noted 2" stroke will cause the bell cranks 53 to pivot about the upper pivots moving the chuck plate sectors radially outwardly. The entire assembly is, of course, vertically movable by means of the ejector piston cylinder 42.

The bottom toe ring 56 cooperates with a substantially conical cast iron spray ring 57 to secure the annular bead 58 of the lower open end of the bladder B therebetween. As perhaps best seen in FIG. 4, the bead 58 is received in an annular recess 59 between the toe ring 56 and spray ring 57 where it is deformed into sealing contact with the toe ring 56 and spray ring 57 be engagement with a split ring 60 which presses the bead 58 against a shoulder 61 on the outer surface of the spray ring. A shoulder 63 on the bottom toe ring 56 serves as a stop for the split ring 60.

The lower end of the spray ring 57 is threadedly connected to a vertically extending cylinder 65 which at its lower end is supported on a vertically adjustable post 66. Within the cylinder 65 is a piston 67 and a rod or post 68. The post 68 extends upwardly through the seal 69 in the rod end of the cylinder 65 and its upper end is connected to socket member 70. The socket member 70 embraces the underside of a molded-in socket portion 71 in the bladder B. The molded socket portion 71 has therein an upwardly opening socket 72 which is the configuration of the pilot nose 51 so that the socket member 70 embraces not only the molded socket portion 71 of the bladder B, but also the pilot nose 51 of the chuck actuator of the upper mold section, thereby assuring proper centering of the bladder B with respect to the tire carcass and mold sections and preventing nonuniform stretching of the bladder during inflation. Moreover, a screw 73 or similar type fastener may be used for positively attaching the bladder socket portion 71 to the post 68 to assure the proper relationship therebetween, and a recess 74 may be provided in the nose 51 for receipt of the head of the screw 73 (see FIG. 1).

The post 68 and the socket member 70 on the upper end thereof thus maintain the bladder assembly B in the proper relationship centered with respect to the tire and molds. Air under pressure is supplied behind the piston 67 to urge or bias the bladder B axially upwardly at all times.

Vertical adjustment of the support rod 66 through the transmission 75 by means of a suitable wrench or turning tool elevates the cylinder 65 and thus the spray ring 57 to the FIG. 5 position permitting the bead 58 of the bladder B to be removed from between the bottom toe ring 56 and the spray ring 57. The split ring 60 is contained within an annular groove 76 in the spray ring 57 having a width somewhat greater than the thickness of the split ring, whereby during the initial vertical movement of the spray ring, the split ring remains stationary to relieve pressure on the bladder bead 58. When the split ring is engaged by the lower wall 77 of the groove 76, however, it is carried by the spray ring 57 to force the bead 58 of the bladder B upwardly clear of the bottom toe ring 56. In this elevated position, the bladder bead 58 may readily be removed from between the shoulder 61 and split ring 60 and the bladder disconnected from the post 68 for replacement by another bladder when required. With the bead 58 of the new bladder positioned between the shoulder 61 and ring 60, the cylinder 65 and spray ring 57 are lowered to cause the bead 58 to be wedged between the bottom toe ring 56 and spray ring 57 due to the tapered outer surface 78 of the bottom toe ring. Continued lowering of the spray ring 57 after engagement of the split ring 60 with the stop 63 causes deformation of the bead 58 between the shoulder 61 and ring 60 into fluid-tight engagement with the spray ring 57 and toe ring 56 as aforesaid. The upper wall 79 of the groove 76 limits the movement of the split ring 60 toward the shoulder 61 and thus controls the amount of deformation of the bead 58.

The spray ring 57 includes an inlet 81 and an annular chamber with spray passages extending therefrom to the upper edge of the spray ring. A curing medium, cooling water, or vacuum may thus be introduced into the bladder in this manner.

In FIG. 2 there is illustrated, in a partially opened position of the press, a slightly modified center post assembly. The spray ring 82 is somewhat foreshortened as compared to the spray ring 57 and its lower end is threaddedly connected to a cylindrical spring retainer 83, the lower end of which it welded to guide tube sleeve 84 through ring 85. The bottom of guide tube sleeve 84 is welded to post 86 through ring 87 and the entire assembly may be vertically adjusted through transmission 88 for removal of and clamping of the bead 58 of the bladder B between the toe ring 56 and the spray ring 82, similar to the FIG. 1 embodiment.

The upper reduced diameter portion 89 of the post 86 is threaded as indicated at 90 and a stroke adjusting nut 91 is mounted thereon. A guide tube 92 is mounted for sliding movement in guide tube sleeve 84 and the back end of such guide tube is provided with an annular stop ring 93. The upper end of the guide tube 92 is secured to the socket member 70 supporting the molded socket portion 71 of the bladder B and there is a screw 95 securely fastening the molded socket portion 71 to the socket member 70. A compression spring 94 extends between the bottom of the spring retainer 83 and the flange 96 at the top of the guide tube 92 in which is secured the socket member 70. The spring 94 thus biases or urges the bladder to its extended position shown which may slightly stretch the bladder beyond its molded condition.

During the opening of the press, the pilot nose 51 will be extended by the piston cylinder assembly 49 the required distance to move the chuck plate sectors 54 beneath the upper bead of the tire T as seen in FIG. 2 to ensure that the tire will be carried with the upper mold section 15 as the press opens. The extension of the pilot nose 51 will move the bladder B down approximately two inches to allow room for the chuck plate sectors 54 to be extended beneath the upper bead of the tire. As the press is opened, the piston 67 in the case of the FIG. 1 embodiment and the spring 94 in the case of the FIG. 2 embodiment will urge and maintain the upper portion of the bladder against the nose or pilot 51 stripping the bladder from the tire.

Referring now additionally to FIG. 3, as the press opens and the upper mold section 15 carries the tire T axially over the bladder B, continued counterclockwise rotation of the bull gears 6 and 7 will then cause the press head 23 and, of course, the upper mold section 15 to move backwardly along the top edges 36 of the side plates 2 and 3. When the press has obtained its fully opened position as seen in FIG. 3, a loader shown generally at 98 will be axially aligned with the lower mold sections and the projecting bladder assemblies therein. The loader 98 is mounted on brackets 99 depending from the press head 23 and the loader includes tow vertically extending guides 100 at the opposite sides of the press. These guides are mounted jus inside the side plates 2 an 3 and include inturned flanges 101 which guide loader carriage 102. The loader carriage 102 includes two side plates 103 with a channel frame 104 extending therebetween. Mounted on the beam 104 is a chuck actuating cylinder 105 which includes an actuator 106 connected to links 107 which are in turn connected to chuck elements 108. There may be four such chuck elements or tire carcass gripping fingers for each chuck and the upper offset ends of such elements are pivoted as indicated at 109 either to the beam 104 or two transverse extensions 110 thereof. The lower ends of the chuck elements 108 are provided with out-turned edges or flanges 111 which fit beneath the upper bead 112 of the tire carcass C to support the same in a suspended position from the chuck.

The chuck further includes a centrally disposed bladder restraining plate 114 having centrally projecting therefrom pilot 115 adapted to fit within the upwardly opening socket in the molded portion 71 at the upper end of the bladder B. The plate 114 and pilot 115 are urged to an extended position by compression spring 116. The plate and pilot serve properly to center the bladder mechanism cooperating with the socket member 70 of the post within the bladder and also to restrain the bladder from swelling upwardly behind the chuck elements as well as to position the top of the bladder properly for the commencement of the shaping cycle.

In operation, as the press head obtains the FIG. 3 position, the carriage 102 will be lowered along the guides with the rollers 117 assisting. The carriage may be lowered by a motor drive unit on the top of the guides 100, not shown, driving chain 118, to which the carriage is secured. The lowering of the carriage will then telescope the carcass C over the upstanding bladder and drive the plate 114 and pilot 115 into engagement with the upper end of the bladder. The lower bead 118 of the carcass may be seated on the lower toe ring 56 or it may be held slightly spaced therefrom by the loader. Before the assembly 105 is retracted to retract the elements 108 and the carriage is elevated, the bladder B will be inflated to cause the same to swell out against the interior of the carcass properly to grip the same and hold the carcass axially centered with respect to the mold sections. When the bladder thus properly grips the carcass, the loader 38 is elevated.

Simultaneously, the ejector cylinder 42 is energized and the tire is stripped from the upper mold section 15. The upper toe ring 47 being secured to the spider 46 moves with the ejector tube 45 to move the tire T to the position indicated. The upper bead of the tire is positively locked between the toe ring and the extended chuck plate sectors 54. When the tire obtains this position, the chuck plate sectors are retracted by retraction of the piston cylinder assembly 49 and the tire drops onto a discharge conveyor 122 extending beneath the tire which may be mounted between the side plates 2 and 3. The ejector cylinder 42 is then retracted and the press is ready to close as soon as the loader 98 is elevated sufficiently to clear the upstanding carcass and bladder. When the press is closed, the loader will be shifted toward the front or left-hand side of the press as seen in FIG. 3 and may then be extended to pick up a further carcass which may be mounted in front of the press and hold the same in elevated position ready to telescope over the upstanding bladder as soon as the press is opened.

Figure 6:
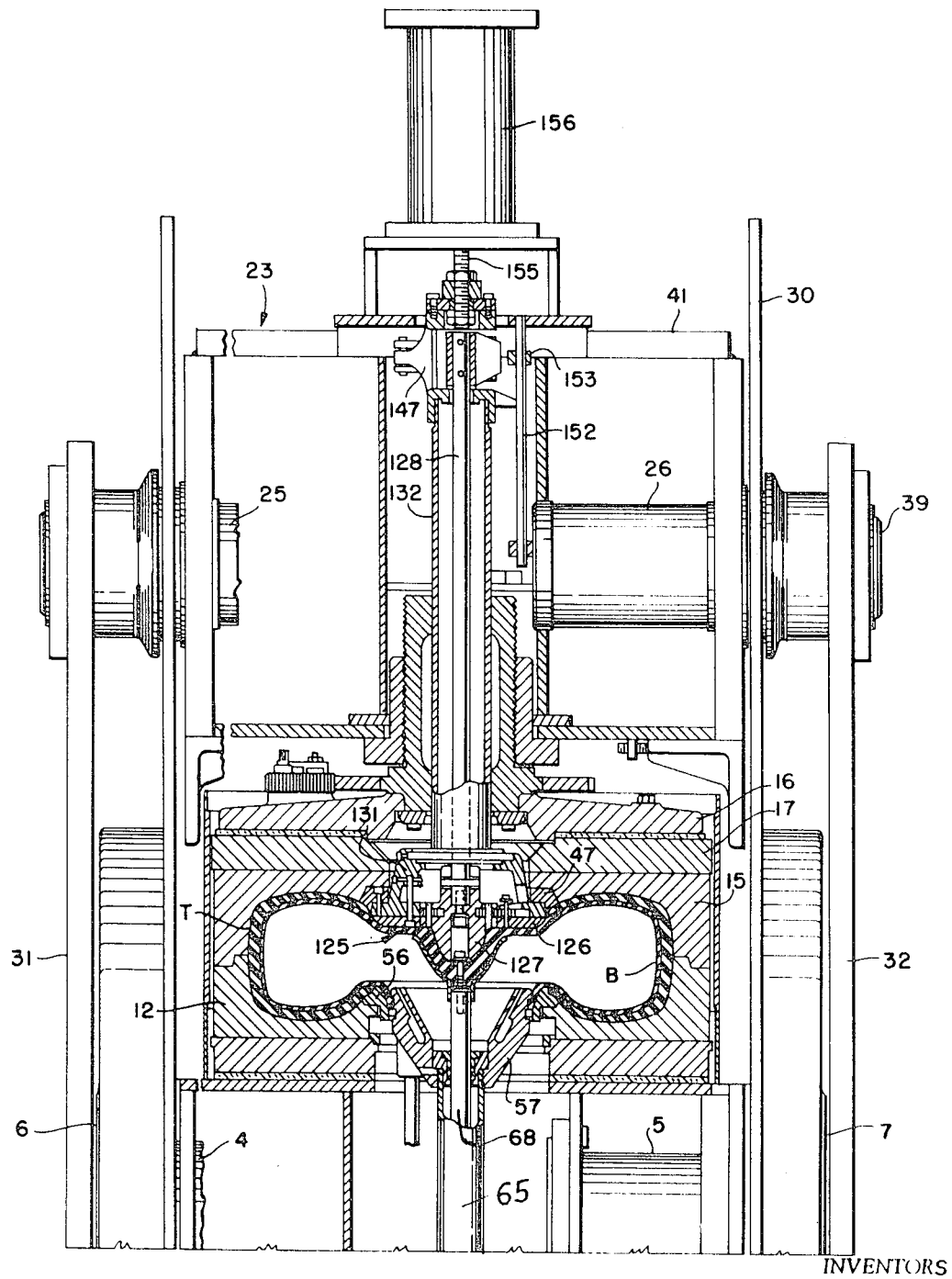
FIG. 6 is a fragmentary vertical section of a press having a modified form of unloading chuck.
Figure 9:
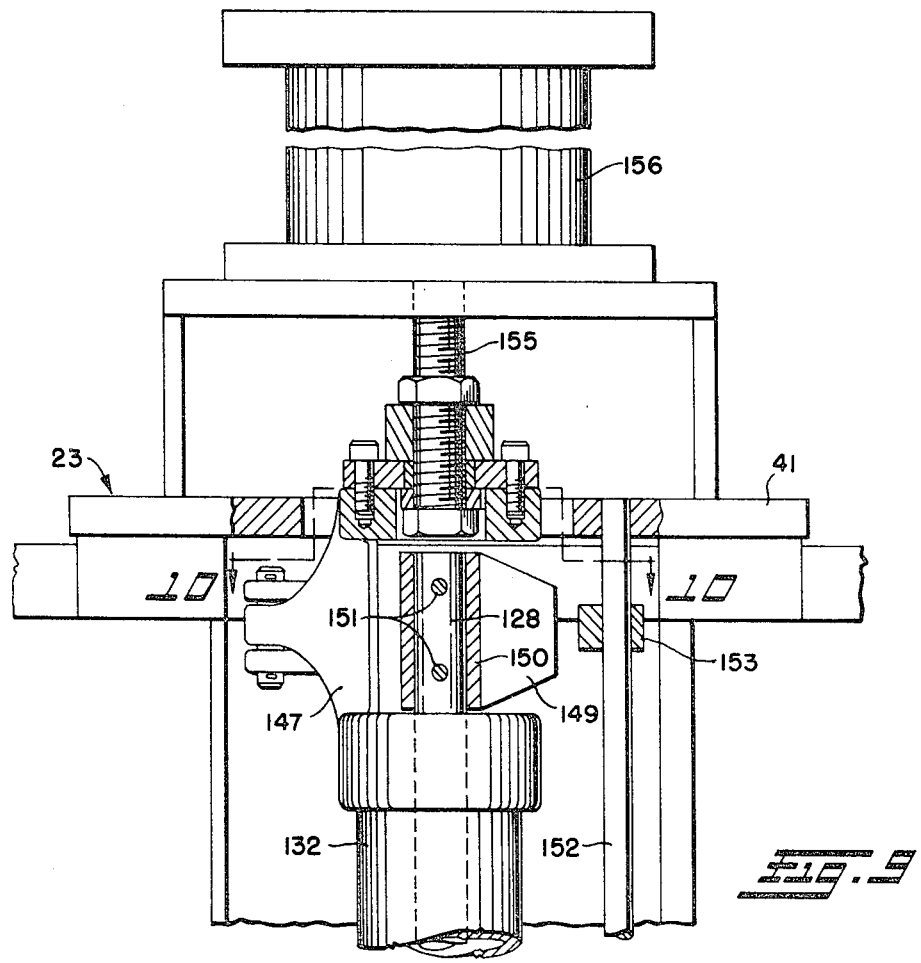
FIG. 9 is an enlarged fragmentary side elevation view, partially broken away, of the upper portion of the ejector assembly for the press of FIG. 6.

In FIG. 6 there is illustrated another form of chuck 125 for use with the press herein having a plurality of chuck sector plates 126 which may be swung outwardly during opening of the press for engaging the upper beads of tires T having different bead diameters, such as thirteen, fourteen, and fifteen inch bead diameters, for example. The details of the chuck 125 are more clearly shown in FIGS. 7 and 8, wherein the pilot nose 127 is shown connected to an actuator rod 128 as by means of a screw 129 and keyed thereto as at 130. Surrounding the upper portion of the pilot nose 127 there is a housing 131 which is removably attached to the lower end of an ejector tube 132 telescoped over the actuator rod 128.

A plurality of the chuck sector plates 126 are pivoted at their radial inner ends to the housing 131 by axially extending pins 133 held in position by lock pins 134 extending through aligned apertures 135, 136 in the housing 131 and pins 133, respectively. Such chuck sector plates 126 are also connected to the pilot nose 127 as by means of links 137 having opposite ends pinned to the sector plates 126 and projecting ears 138 on the pilot nose 127 as at 139 and 140, respectively. The pins 139 extend through arcuate slots 141 in an inturned flange 142 of the housing 131, whereby rotation of the pilot nose 127 in opposite directions causes a corresponding inward and outward swinging movement of the sector plates 126 about their respective pivots 133 between the solid and phantom line positions of FIG. 8.

Figure 10:
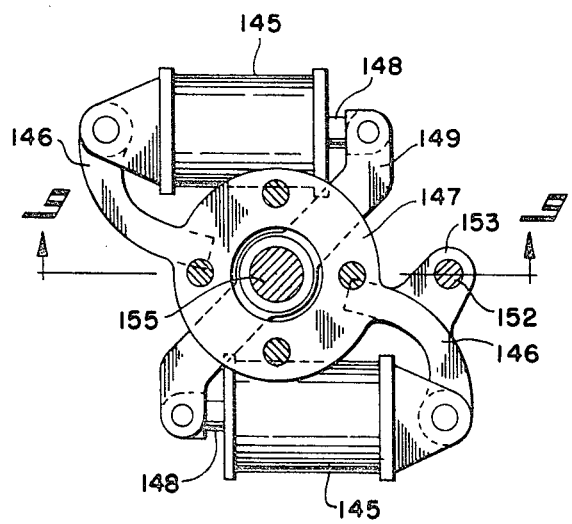
FIG. 10 is a horizontal section through the ejector assembly taken on the plane of the line 10—10, FIG. 9.

Rotation of the pilot nose 127 to cause swinging out of the sector plates 126 is effected through actuation of a pair of air cylinders 145 which as shown in FIG. 10 are pivoted to arms 146 projecting outwardly from a spider 147 fixed to the upper end of the ejector tube 132. The rods 148 of the air cylinder 145 are connected to opposite ends of a twist arm 149 having a central sleeve 150 suitably secured to the actuator rod 128 by roll pins 151 or the like. A guide rod 152 projecting downwardly from the top plate 41 of the press head 23 through an ear 153 on one of the spider arms 146 holds the ejector tube 132 and thus the chuck housing 131 against turning during rotation of the rod 128 and pilot nose 127 keyed thereto by actuation of the air cylinders 145 for effecting such swinging movement of the chuck sector plates 126 as aforesaid.

The entire chuck assembly 125, actuator rod 128, and ejector tube 132 are supported by connection of the rod 155 of an ejector cylinder 156 mounted on the press head 23 with the spider 147, whereby actuation of the ejector cylinder 156 will cause stripping of the tire which is carried with the upper mold section 15 by the sector plates 126 as the press opens, as before. Thereafter, the chuck sector plates 126 are retracted for discharging of the tire onto the discharge conveyor 122.

It will, of course, be appreciated that both loading and shaping procedures may vary among tire manufacturers. Accordingly, with the loading and unloading occurring simultaneously or even partially while the press is closed, it can be seen that the cured tire can be stripped from the upstanding bladder and unloaded while the green tire C is telescoped over the upstanding bladder so that the press is open only for a minimal amount of time. Moreover, both the loader and the upper mold section or unloader interfit with the socket member 70 on the post, and the molded portion 71 of the bladder to ensure accurate centering during both the loading, unloading and shaping. When the bladder is expanded to grip the tire, the upper mold section then moves axially down from the position shown in FIG. 2, for example, squeezing the tire between the mold sections to the tire shape shown in FIG. 1. Because of the firm support of the bladder at its upper end, the bladder cannot shift with respect to the post and the entire assembly is maintained centered with both the loader and the upper mold section. The firm support of the bladder by the post also assures long bladder life and the simplified mounting of the post enables the spray ring to be moved vertically to remove and replace the bladder quickly when required.

We, therefore, particularly point out and distinctly claim as our invention:

1. A tire curing press comprising upper and lower complementary mold sections, means operative to move the upper mold section vertically away from and then laterally of the lower mold section, an axially upwardly extending bladder assembly from said lower mold section, post means operative resiliently to urge said bladder assembly to its axially extended position when the press is fully open for being loaded, a loader means mounted on and movable with said upper mold section to telescope a tire carcass over said extended bladder assembly when said press is fully opened and the loader means is axially aligned with the extended bladder, means on said post means, bladder assembly and loader means interfitting to engage the top of the bladder assembly to maintain the tire carcass and bladder assembly in proper relative vertical and axial position during loading, and tire removal chuck means mounted within said upper mold section operative to pull a cured tire axially of said bladder assembly while simultaneously extending the latter, and then laterally to shift such tire when clear of said bladder assembly to clear the lower mold section and projecting bladder assembly during movement of the upper mold section vertically away from and then laterally of the lower mold section as aforesaid for overhead loading.

2. A tire curing press as set forth in claim 1 wherein said tire removal chuck means comprises a housing, a plurality of chuck sector plates pivoted to said housing for movement between inner positions clear of the upper bead of the cured tire and outer positions underlying such upper tire bead, an actuator rod, means mounting said actuator rod for rotation within said housing, and means interconnecting said actuator rod and chuck sector plates for effecting such inward and outward movements of said chuck sector plates in response to rotation of said actuator rod in opposite directions.

3. A tire curing press comprising top and bottom mold sections, means mounting said top mold section for movement axially away from and then laterally of said bottom mold section to open said press, a shaping bladder assembly projecting axially upwardly from said bottom mold section, an unloading chuck means mounted on said top mold section to pull a shaped tire from the bladder assembly as the mold sections move apart and laterally to clear the tire from the projecting bladder assembly and lower mold section as the press fully opens, means to strip the tire from the upper mold section onto a discharge conveyor, said projecting bladder assembly including a center post and a bladder, and means on said center post, bladder, and unloading chuck means to maintain the tire bladder assembly in proper relative vertical and axial position during curing.

4. A tire curing press as set forth in claim 3 wherein said last-mentioned means comprises a socket on said post means, a molded socket on said bladder fitting closely within said socket on said post means, and a pilot on the center of said upper mold section fitting in said molded socket and well within said socket on said post means.

5. A tire curing press comprising upper and lower complementary mold sections, means operative to move the upper mold section vertically away from and then laterally of the lower mold section, an axially extending bladder assembly in said lower mold section, post means operative to bias said bladder assembly toward its axially extended position, and a tire removal chuck means carried by said upper mold section for movement therewith operative to engage the upper bead of a cured tire during vertical movement of said upper mold section away from said bottom mold section for carrying of the tire with said upper mold section, said tire removal chuck means comprising a housing, a plurality of chuck sector plates pivoted to said housing by axially extending pivots for radial swinging movement about said axial pivots between inner positions clear of the upper tire bead and outer positions underlying such upper tire bead, an actuator rod, means mounting said actuator rod for rotation within said housing, and means interconnecting said actuator rod and chuck sector plates for causing such inward and outward radial swinging movements of said plates in response to rotation of said actuator rod in opposite directions.

6. A tire curing press as set forth in claim 5 wherein said last-mentioned means comprises links for each sector plate having opposite ends pinned to said actuator rod and associated sector plates by pins, and arcuate slots in said housing through which the sector plate pins extend for controlling the amount of swinging movement of said sector plates in response to rotation of said actuator rod as aforesaid.

7. A tire curing press as set forth in claim 5 wherein said means mounting said actuator rod for rotation within said housing comprises an ejector tube telescoped over said actuator rod, said housing being secured to the lower end of said ejector tube, a piston-cylinder assembly carried by said ejector tube and having its piston rod operatively connected to said actuator rod, and means mounting said ejector tube against rotation, whereby the actuation of said piston-cylinder assembly causes rotation of said actuator rod.

8. A tire curing press as set forth in claim 7 further comprising means mounting said actuator rod, ejector tube, and tire removal chuck means for vertical movement with respect to said upper mold section to strip the cured tire from said upper mold section after said upper mold section has been moved vertically away from and then laterally of said lower mold section as aforesaid.

9. A tire curing press as set forth in claim 6 further comprising a pilot nose keyed to the lower end of said actuator rod, said links being pinned to said pilot nose, a socket on said post means, and a molded socket on said bladder assembly fitting closely within said socket on said post means, said pilot nose fitting in said molded socket and well within said socket on said post means.

References Cited
UNITED STATES PATENTS

| | | | |
|---|---|---|---|
| 3,097,394 | 7/1963 | Mallory et al. | 18—2X |
| 3,378,882 | 4/1968 | Turk et al. | 18—2 |

J. HOWARD FLINT, JR., Primary Examiner